Aug. 23, 1960 T. H. CLINE 2,949,971
DIFFERENTIAL CONTROL VALVE FOR FLUID OPERATED VEHICLES
Filed July 23, 1958 4 Sheets-Sheet 1

INVENTOR.
Truman H. Cline
BY Nathan N. Kraus
Frank H. Marlos
Attorneys

Aug. 23, 1960 T. H. CLINE 2,949,971
DIFFERENTIAL CONTROL VALVE FOR FLUID OPERATED VEHICLES
Filed July 23, 1958 4 Sheets-Sheet 2

INVENTOR.
Truman H. Cline
BY Nathan N. Kraus
Frank H. Marks
Attorneys

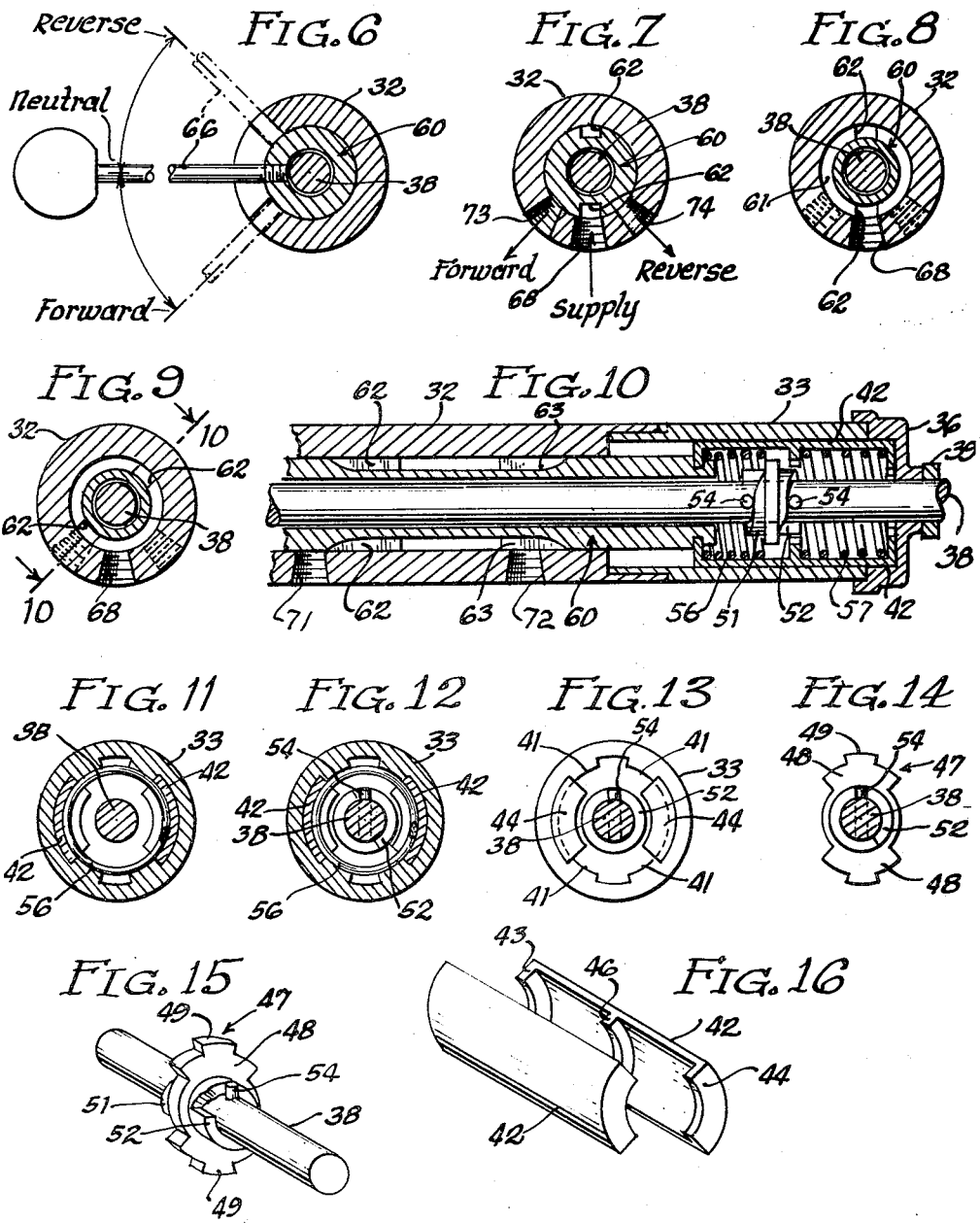

Aug. 23, 1960 T. H. CLINE 2,949,971
DIFFERENTIAL CONTROL VALVE FOR FLUID OPERATED VEHICLES
Filed July 23, 1958 4 Sheets-Sheet 4
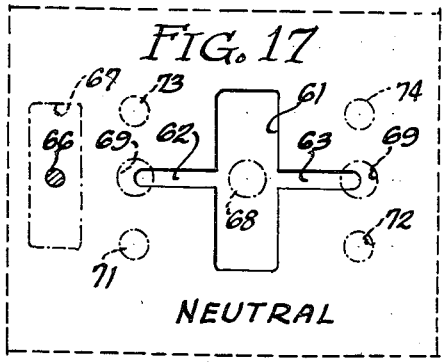
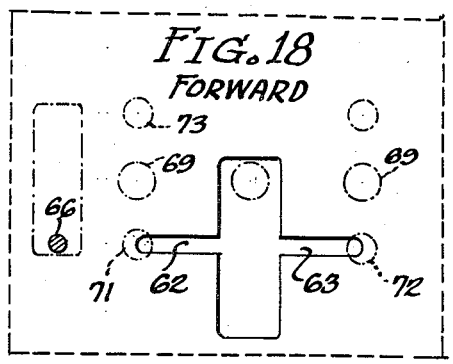
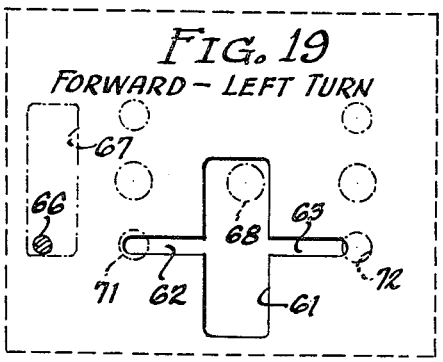
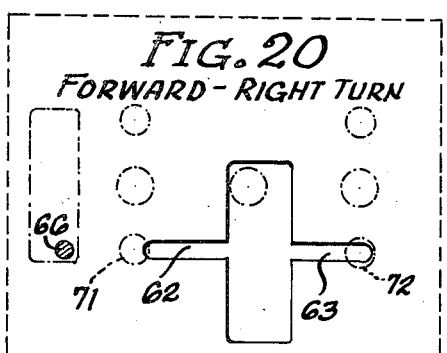
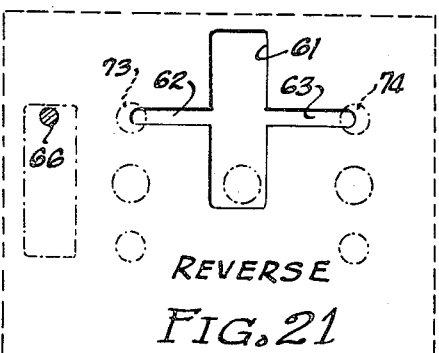
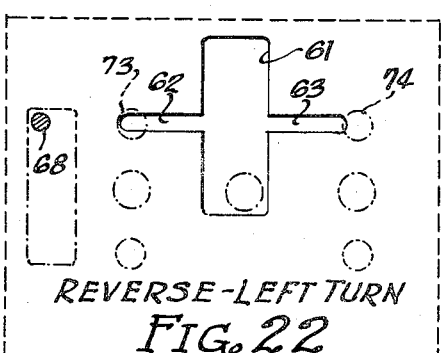
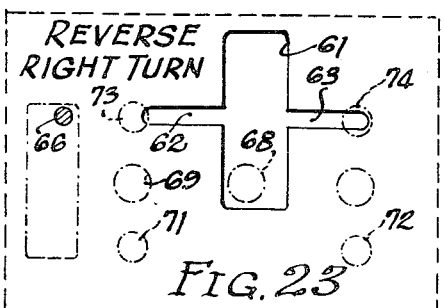
INVENTOR.
Truman H. Cline
BY Nathan N. Kraus
Frank H. Marks
Attorneys

United States Patent Office 2,949,971  
Patented Aug. 23, 1960

2,949,971
DIFFERENTIAL CONTROL VALVE FOR FLUID OPERATED VEHICLES

Truman H. Cline, Newark, Ohio, assignor to Sears, Roebuck and Co., Chicago, Ill., a corporation of New York Filed July 23, 1958, Ser. No. 750,476

12 Claims. (Cl. 180—6.3)

My invention relates to an improved differential control valve for fluid pressure operated vehicles.

One of the objects of my invention is the provision of an improved control valve embodying means for automatically effecting a differential action of the driving wheels in response to steering of the vehicle so as to compensate for the difference in linear speeds between the inside and outside wheels in executing turns whereby to prevent premature wearing of the tires and skidding thereof on the ground surface.

Another object of my invention is the provision of a control valve of the foregoing character which affords a high degree of efficiency, smoothness of operation, flexibility of control and simplicity and economy of manufacture.

Other and further objects and advantages of my invention will become apparent from my description when considered in connection with the accompanying drawings, in which—

Figure 24:
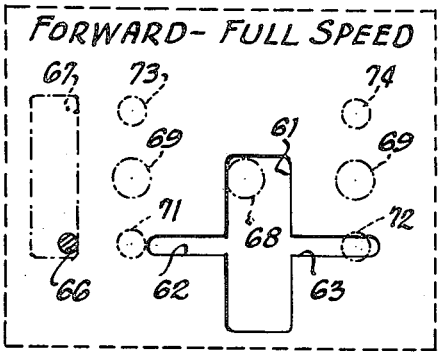
Figure 25:
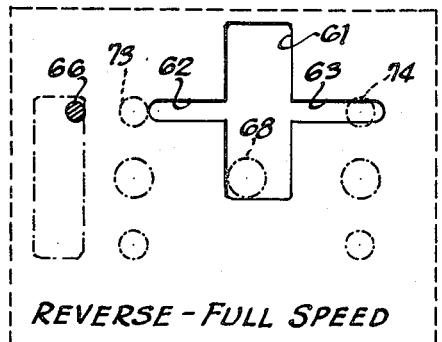
Figure 2:
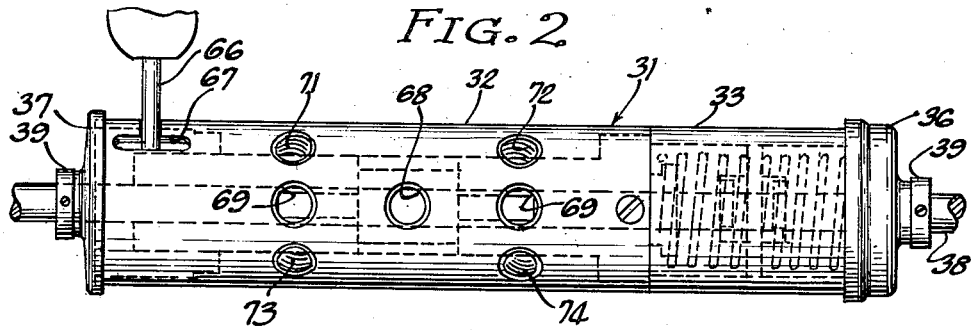
Fig. 2 is a side elevational view of a control valve in accordance with my invention.
Figure 3:
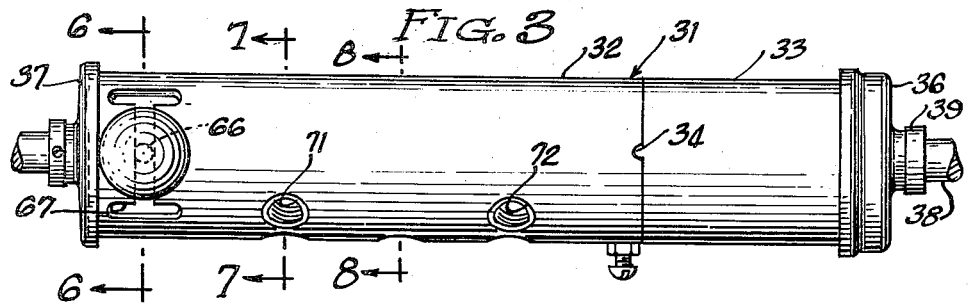
Fig. 3 is a side elevational view taken with the device of my invention rotated to a position 90° from that illustrated in Fig. 2.
Figure 4:
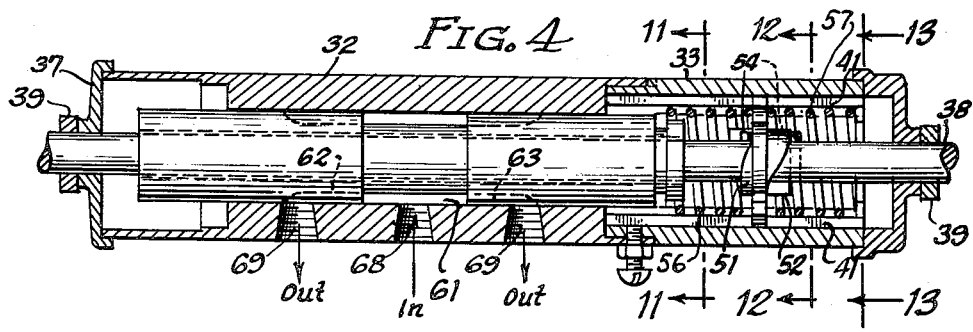
Fig. 4 is a longitudinal cross sectional view of the device of my invention illustrated in Fig. 3.

Figs. 6, 7 and 8 are cross sectional views taken on lines 6—6, 7—7 and 8—8, respectively, of Fig. 3;

Fig. 9 is a cross sectional view similar to Fig. 8, but showing the valve rotor element in a different position of operation;

Fig. 10 is a cross sectional view taken on line 10—10 of Fig. 9 and showing the parts in the relationship corresponding to that illustrated in Fig. 24;

Figs. 11, 12 and 13 are cross sectional views taken substantially on lines 11—11, 12—12 and 3—3 of Fig. 4;

Fig. 14 is an end elevational view of a structural detail;

Figs. 15 and 16 are perspectively views of structural details;

Figs. 17–25 are more or less diagrammatic views showing the parts in different positions of operation.

Figure 1:
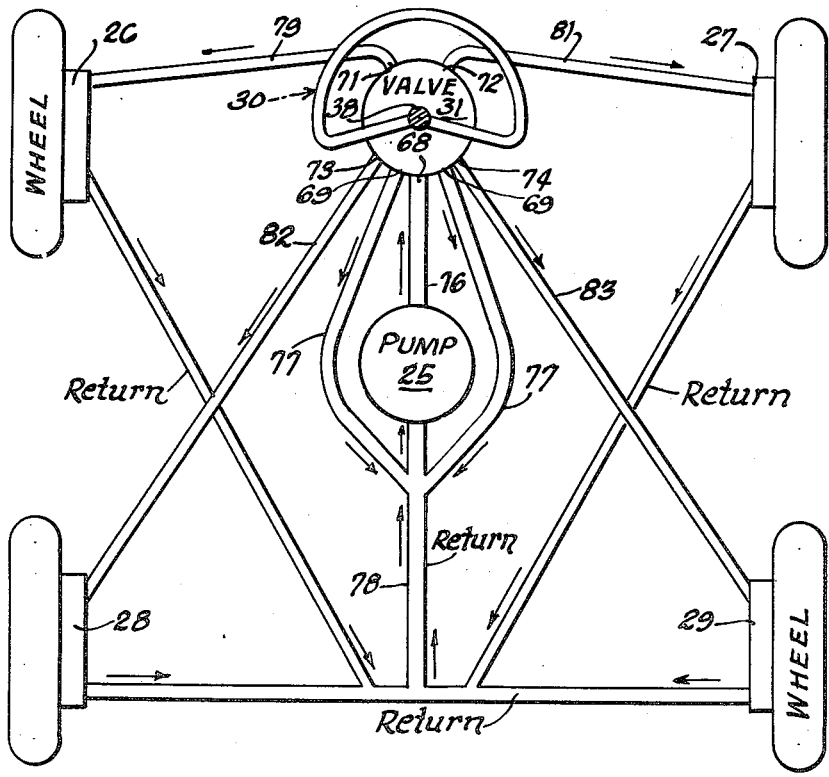
Fig. 1 is a fluid circuit diagram of a pressure fluid system with my invention incorporated therein.

Referring to the drawings, Fig. 1 illustrates the fluid circuit diagram of a motor vehicle having a hydraulic pumping unit 25 driven by a suitable engine of the vehicle and adapted to deliver pressure fluid to the turbine units 26, 27, 28 and 29 associated with each of the wheels. The operator may control the flow of pressure fluid to the respective turbine units so as to drive the vehicle in a forward or reverse direction, the differential action, however, being automatically controlled by the steering mechanism 30 of the vehicle, as will be hereinafter explained.

For the purpose of illustration, a four-wheel drive vehicle is illustrated, each wheel being coaxially operatively connected to a turbine unit. The turbine units 26 and 27 of the two front wheels are arranged to drive the vehicle in a forward direction, and the turbine units 28 and 29 of the two rear wheels are arranged to drive the vehicle in a rearward direction. The turbine units may be of any well known type and each is provided with inlet and discharge ports connected by suitable conduits to the valve construction 31 of my invention, all as will be hereinafter explained.

The valve construction 31 of my invention comprises a generally cylindrical housing formed of two coaxially disposed sections 32 and 33, the adjacent ends of which are provided with a cooperating groove and projection 34 to effect locking of the sections against relative rotational movement. Cap members 36 and 37 are provided at each end, each being provided with an axial bore to receive a central shaft 38 which passes axially through the housing as shown. Collars 39 fixed on the shaft 38 are provided for retaining the cap members. The shaft 38 has a steering wheel 30 mounted at one end, the opposite end of the shaft being connected to the steering mechanism of the vehicle in a well known manner.

Figure 5:
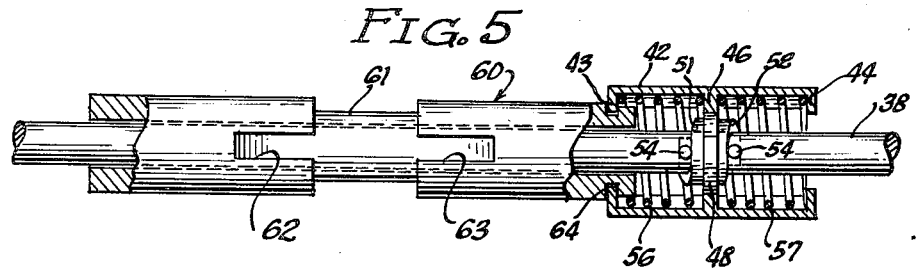
Fig. 5 is an elevational view, partly in cross section, of the rotor assembly removed from the housing.

The housing section 33 is provided with four longitudinally extending splines 41 arranged as illustrated in Figs. 11–13. Received within the housing section 33 are a pair of members 42 arcuately formed in cross section as illustrated in Fig. 16. Said members are identical in construction and each is provided with end flanges 43 and 44 and a medially disposed flange 46. It will be seen that the members 42 are diametrically opposed and are received between splines 41 of the housing section, and accordingly are keyed thereto, but are, however, slidable relative thereto. Rotatably mounted on the shaft 38 is a cam member 47 having an intermediate portion 48 provided with opposed lugs 49 suitably shaped so as to be received between the splines 41 in the housing section 33 intermediate the arcuate members 42. The cam member 47 has opposed camming surfaces 51 and 52, each cooperating with one of a pair of pins 54 fixed on the shaft 38. The said cam member thus is confined between the pins 54 and when the shaft is rotated relative axial movement of the intermediate portion 48 of the cam member is effected, as will be more fully explained hereinafter. Confined between the end flanges 43 and 44 and the medial flanges 46 of the members 42 are springs 56 and 57. The cam member 47 is disposed substantially medially of the members 42 and the intermediate portion 48 of the cam member is aligned with the medial flanges 46, as illustrated clearly in Figs. 4 and 5, so that said intermediate portion is confined between the springs 56 and 57.

A valve rotor element, indicated generally by the numeral 60, is of generally cylindrical construction and is provided with an axial bore to receive the shaft 38, said rotor element being rotatable and axially slidable relative to the shaft. The rotor element is provided with a medial annular channel 61 and two pairs of diametrically opposed oppositely extending longitudinal channels 62 and 63 communicating therewith. The longitudinal channels 62 and 63 are all equal in area. The arrangement affords a hydraulic balance to prevent side thrust on the rotor element which might cause it to bind with respect to the housing, thus allowing it to rotate freely. The rotor element is provided with an annular groove 64, as will be seen by reference to Fig. 5, and the flanges 43 of the members 42 are engaged in said groove. Thus, while the rotor element 60 may rotate relative to the members 42 and their associated structure, both the rotor element and the members 42 will move axially simultaneously.

The opposite end of the rotor element has fixed thereto a handle 66 which extends through a suitable cutout 67 in the housing 32 and it will be apparent that movement of the handle 60 will effect rotational movement of the rotor element. The said rotor element also may be moved by handle 66 axially against the resistance of springs 56 and 57 for a purpose which will be hereafter explained.

The housing section 32 is provided with a plurality of ports as will be presently described. The inlet port 68 is located substantially medially of the housing section and in every position of operation is in registration with the annular channel 61 of the rotor element 60. A pair of return ports 69, 69 are disposed on opposite sides of the inlet port 68 and are arranged in longitudinal alignment therewith. Two pairs of outlet ports 71, 72 and 73, 74 are arranged in transverse alignment with the return ports 69. The rotor element 60 may be rotated as will be hereinafter explained to effect selective registration of respective pairs of ports with the longitudinal channels 62 and 63.

Referring to the fluid circuit diagram illustrated in Fig. 1, the inlet port 68 is connected to a pressure fluid pump 25 through conduit 76. The return ports 69 are connected by return conduits 77 to the main return line 78 which is connected to the sump of the pump 25. Outlet ports 71, 72 are connected by conduits 79 and 81, respectively, to the front wheel turbine units 26 and 27, respectively, and outlet ports 73 and 74 are connected by conduits 82 and 83, respectively, to rear wheel turbine units 28 and 29, respectively. Each of the turbine units is connected to a return conduit which feeds into the main return line 78.

With pump 25 in operation and with the valve adjusted for neutral position the ports 69 will be in registration with the channels 62 and 63 as illustrated in Fig. 17. In this condition the pressure fluid is caused to by-pass the turbine units and is returned to the sump of the pump.

In order to move the vehicle in a forward direction the valve is adjusted by rotating the rotor element 60 to align channels 62 and 63 with the outlet ports 71 and 72 which feed fluid to the front turbine units 26 and 27, respectively (Fig. 18). In this relationship equal areas of the channels 62 and 63 are aligned with ports 71 and 72 and substantially equal amounts of pressure fluid are supplied to the turbine units 26 and 27 of the front wheels so that both are caused to rotate at the same speed. In the course of any steering movement of the vehicle from straight line travel, the valve of my invention will automatically operate to adjust the relative areas of the channels aligned with the outlet ports to control the delivery of pressure fluid to the turbine units to compensate for the difference in linear speeds of the inside and outside wheels of the vehicle with respect to the right or left steering movement of the wheels. For example, assuming that the operator of the vehicle turns the shaft 38 to the left with a view to executing a left turn, such turning movement, by reason of the action of the cam member 47, effects axial movement of the rotor element 60 in relation to the housing 32, and accordingly the relative areas of the channels in relation to the ports are changed. Thus, as seen in Fig. 19, the port 71 is in registration with a greater area of the channel 62 than is the port 72 with the channel 63. Accordingly, the pump 25 will deliver to the right front turbine unit 27 a proportionately greater flow of pressure fluid than to the left front turbine unit 26 to afford to the outer front right wheel, when the vehicle is making a left turn, a greater linear speed than to the inner left front wheel. It should be noted that Fig. 19 illustrates what may be considered an extreme condition, as when the wheels are turned to their maximum limit. It will be understood that as the rotor element 60 moves from the position illustrated in Fig. 18 to that of Fig. 19 the area of the channel 62 in relation to port 71 increases progressively, while the area of channel 63 to port 72 decreases correspondingly. Thus, the flow of pressure fluid to the respective front wheel turbine units is proportioned in relation to the degree of turning being effected.

Fig. 20 illustrates the relationship of the channels 62 and 63 of the rotor element to the outlet ports 71 and 72 at a maximum point of turning when the vehicle is being steered to the right. Under these conditions the turbine unit 26 will now receive a greater flow of pressure fluid than turbine unit 27.

Fig. 21 illustrates the relationship of the channels 62 and 63 to the outlet ports 73 and 74 when the vehicle is traveling in a straight line rearward direction. Said ports communicate through conduits 82, 83 with the rear wheel turbine units 28 and 29 which when energized by pressure fluid are caused to drive the rear wheels in a reverse direction. Under such conditions no pressure fluid is being delivered to the turbine units of the front wheels. It will be understood that the rotor element is required to be rotated relative to the housing 32 by the handle 66 in order to obtain any of the conditions hereinabove discussed. Figs. 22 and 23 illustrate the relationship of the valve parts when the vehicle is effecting left and right turns in a reverse direction.

When the vehicle is operating without a load the operator may wish to travel over the ground in a straight line direction at a higher rate of speed than when operating under load conditions. Under such circumstances the operator, by means of the handle 66, may rotate the valve rotor element 60 to align the channels 62 and 63 with the outlet ports 71 and 72, respectively, to the position illustrated in Fig. 18 for forward movement and then by depressing the handle 66 fully, the rotor element is shifted axially so that the channels 62 and 63 are caused to assume the relationship to the ports 71 and 72 as illustrated in Fig. 24. Here it can be seen that the port 72 is in communication with the channel 63 while port 71 is entirely blocked off from channel 62 (Fig. 10). Thus, the entire volume of pressure fluid delivered from the pump 25 is directed to the turbine unit 26 which will be caused to rotate at twice the normal speed and thereby substantially double the ground speed at which the vehicle will travel. It will be understood that the handle 66 must be held by the operator in depressed position against the pressure of spring 57 in order to travel at such increased speed. When executing a turn the operator releases handle 66 permitting a return to normal operation as hereinabove described.

It will be seen that the foregoing arrangement affords means for manually overriding the automatic control of the flow of pressure fluid to respective turbines. Thus, by fully depressing the handle 66 and with the wheels positioned for straightway travel, the valve rotor is actuated to produce the same conditions as regards the flow of pressure fluid as when the wheels are turned to a maximum point in executing a turn. Correspondingly, it will be understood that when the ports and channels are in the relative positions illustrated in Fig. 21 for reverse movement of the vehicle, upon depressing the handle 66 as above, the ports 73, 74 and channels 62, 63 are caused to assume the relationship illustrated in Fig. 25 where only the channel 63 and port 74 are in communication so that pressure fluid can flow only to turbine 29 to effect reverse movement of the vehicle at substantially double the rate of normal travel.

It will also be understood that the handle 66 may be drawn upwardly against resistance of spring 56 both for forward and reverse movement so as to direct pressure fluid to turbines opposite to those hereinabove described.

While a four-wheel drive system has been described, it will be understood that my invention may be applied to a two-wheel or other multiple wheel drive system in a manner well understood in the art.

Various changes coming within the spirit of my invention may suggest themselves to those skilled in the art. Hence, I do not wish to be limited to the specific embodiments shown and described or uses mentioned, but intend the same to be merely exemplary, the scope of my invention being limited only by the appended claims.

I claim:

1. In a fluid driving system for automotive vehicles having a pressure fluid pump and a turbine unit operatively associated with each wheel of a vehicle, certain of said turbine units being arranged to drive said vehicle in a forward direction and other of said turbine units being arranged to drive said vehicle in a rearward direction, a control valve for selectively controlling the delivery of pressure fluid to respective turbine units to drive the same, said valve comprising a housing having an inlet port, a return port, a first pair of outlet delivery ports and a second pair of outlet delivery ports, each of said outlet ports being connected to a respective turbine unit, a valve rotor element within said housing, said rotor element having a medial channel communicating with said inlet in all positions of operation and a pair of longitudinally extending channels communicating with said medial channel, means for selectively rotationally shifting said rotor element to align said longitudinally extending channels with respective outlet delivery ports, a shaft extending coaxially of said rotor element, said rotor element being rotatably and axially slidable relative to said shaft, one end of said shaft being connected to the steering means of said vehicle, means connected to the other end of said shaft for rotating the same whereby to steer said vehicle, means associated with said shaft for axially shifting said rotor element in one direction or another as said shaft is rotated, the supply of pressure fluid to the driving turbine units being thereby automatically relatively proportioned according as a right or left hand turn is executed so as to produce a differential action on said turbine units.

2. In a fluid driving system for automotive vehicles having a pressure fluid pump and turbine units operatively associated with certain wheels of a vehicle, said turbine units being arranged to drive said vehicle in forward or rearward directions, a control valve for selectively controlling the delivery of pressure fluid to said turbine units to drive the same, said valve comprising a housing having an inlet port, a return port and a pair of outlet delivery ports, each of said outlet delivery ports being connected to a respective turbine unit, a valve rotor element within said housing, said rotor element having a medial channel communicating with said inlet in all positions of operation, and a pair of longitudinally extending channels communicating with said medial channel, means for selectively rotationally shifting said rotor element to align said longitudinally extending channels with respective outlet delivery ports, a shaft extending coaxially of said rotor element, said rotor element being rotatably and axially slidable relative to said shaft, one end of said shaft being connected to the steering means of said vehicle, means connected to the other end of said shaft for rotating the same whereby to steer said vehicle, means associated with said shaft for axially shifting said rotor element in one direction or another as said shaft is rotated, the supply of pressure fluid to the driving turbine units being thereby automatically relatively proportioned according as a right or left hand turn is executed so as to produce a differential action on said turbine units.

3. The invention as defined in claim 2 including means for manually shifting said rotor element axially independently of said shaft.

4. In a fluid driving system for automotive vehicles having a pressure fluid pump and a turbine unit operatively associated with each wheel of a vehicle, certain of said turbine units being arranged to drive said vehicle, a control valve for selectively controlling the delivery of pressure fluid to respective turbine units to drive the same, said valve comprising a housing having an inlet port, a return port, a pair of outlet delivery ports, a valve rotor element within said housing, said rotor element having a channel communicating with said inlet port in all positions of operation and a pair of longitudinally extending channels communicating with said first mentioned channel, means for selectively rotationally shifting said rotor element to align said longitudinally extending channels with respective outlet delivery ports, a shaft extending coaxially of said rotor element, said rotor element being rotatably and axially slidable relative to said shaft, one end of said shaft being connected to the steering means of said vehicle, means connected to the other end of said shaft for rotating the same whereby to steer said vehicle, means associated with said shaft for axially shifting said rotor element in one direction or another as said shaft is rotated, the supply of pressure fluid to the driving turbine units being thereby automatically relatively proportioned accordingly as a right or left hand turn is executed so as to produce a differential action on said turbine units.

5. In a fluid driving system for automotive vehicles having a pressure fluid pump and a turbine unit operatively associated with certain wheels of a vehicle, said turbine units being arranged to drive said vehicle, a control valve for selectively controlling the delivery of pressure fluid to said turbine units to drive the same, said valve comprising a housing having an inlet port, a return port, and a pair of outlet delivery ports, a valve rotor element within said housing, said rotor element having a channel communicating with said inlet port in all positions of operation and having a pair of longitudinally extending channels communicating with said first mentioned channel, means for selectively rotationally shifting said rotor element to align said longitudinally extending channels with respective outlet delivery ports, a shaft extending coaxially of said rotor element, said rotor element being rotatably and axially slidable relative to said shaft, one end of said shaft being connected to the steering means of said vehicle, means connected to the other end of said shaft for rotating the same whereby to steer said vehicle, means associated with said shaft for axially shifting said rotor element in one direction or another as said shaft is rotated, the supply of pressure fluid to the driving turbine units being thereby automatically relatively proportioned accordingly as a right or left hand turn is executed so as to produce a differential action on said turbine units.

6. The invention as defined in claim 5 including means for manually shifting said rotor element axially independently of said shaft.

7. The invention as defined in claim 2 in which the last mentioned means includes a cam means operatively connected with the rotor element, and cam follower means operatively connected with said shaft.

8. The invention as defined in claim 5 in which the last mentioned means includes a cam means operatively connected with the rotor element, and cam follower means operatively connected with said shaft.

9. In a fluid driving system for an automotive vehicle a control valve comprising a housing having an inlet port, a return port, a first pair of outlet delivery ports and a second pair of outlet delivery ports, a rotor element within said housing, said rotor element having a medial channel communicating with said inlet port in all positions of operation and a pair of longitudinally extending channels communicating with said medial channel, means for selectively rotationally shifting said rotor element to align said longitudinally extending channels with respective outlet delivery and return ports, a shaft extending coaxially of said rotor, said rotor being rotatably and axially slidable relative to said shaft, one end of said shaft being connected to the steering means of said vehicle, means connected to the other end of said shaft for rotating the same whereby to steer said vehicle, means associated with said shaft for axially shifting said rotor element in one direction or another as said shaft is rotated to increase or decrease the area of said longitudinally extending channels in registration with respective outlet ports, the supply of pressure fluid being thereby automatically relatively proportioned according as a right or left hand turn is executed by said vehicle so as to produce a differential action.

10. In a fluid driving system for an automotive vehicle a control valve comprising a housing having an inlet port, a return port and a pair of outlet delivery ports, a rotor element within said housing, said rotor element having a channel communicating with said inlet port in all positions of operation, and a pair of longitudinally extending channels communicating with said first mentioned channel, means for selectively rotationally shifting said rotor element to align said longitudinally extending channels with respective outlet delivery ports, a shaft extending coaxially of said rotor, said rotor being rotatably and axially slidable relative to said shaft, one end of said shaft being connected to the steering means of a vehicle, means connected to the other end of said shaft for rotating the same whereby to steer said vehicle, means associated with said shaft for axially shifting said rotor element in one direction or another as said shaft is rotated to increase or decrease the area of said longitudinally extending channels in registration with respective outlet ports, the supply of pressure fluid being thereby automatically relatively proportioned accordingly as a right or left hand turn is executed by said vehicle so as to produce a differential action.

11. The invention as defined in claim 10 including means for manually shifting said rotor element axially independently of said shaft.

12. The invention as defined in claim 10 in which the last mentioned means includes a cam element operatively connected with said rotor element, and cam follower means operatively connected with said shaft.

References Cited in the file of this patent

UNITED STATES PATENTS

| | | |
|---|---|---|
| 1,026,662 | Eisner | May 21, 1912 |
| 1,293,702 | Carter | Feb. 11, 1919 |
| 2,774,434 | Ferris | Dec. 18, 1956 |
| 2,807,935 | Lapsley | Oct. 1, 1957 |